United States Patent [19]
Wood, III et al.

[11] Patent Number: 4,934,511
[45] Date of Patent: Jun. 19, 1990

[54] AUTOMATIC CONVEYING SYSTEM

[75] Inventors: David B. Wood, III, Mason; Charles Hart, Xenia, both of Ohio

[73] Assignee: Cincinnati Milacron Inc., Cincinnati, Ohio

[21] Appl. No.: 380,110

[22] Filed: Jul. 14, 1989

[51] Int. Cl.$^5$ .............................................. B65G 43/08
[52] U.S. Cl. ................................ 198/464.2; 198/468.6; 198/751
[58] Field of Search .................. 198/464.2, 468.6, 751, 198/774; 414/750

[56] References Cited

U.S. PATENT DOCUMENTS

| | | | |
|---|---|---|---|
| 3,417,858 | 12/1968 | Heard | 198/774 |
| 4,236,626 | 12/1980 | Noe | 198/468.6 |
| 4,357,128 | 11/1982 | Gooden et al. | 198/751 |
| 4,387,800 | 6/1983 | Noe | 198/774 |
| 4,711,342 | 12/1987 | Abraham | 414/750 |

FOREIGN PATENT DOCUMENTS 1425147 9/1988 U.S.S.R. .......................... 198/468.6

Primary Examiner—Joseph E. Valenza
Attorney, Agent, or Firm—Frost & Jacobs

[57] ABSTRACT

A longitudinal conveying system for mechanically feeding one or more workpieces to a predetermined loading position, comprising a pair of spaced, parallel longitudinal workpiece supports, with each such supports including an upper support face and having a distal end and a proximal end. The predetermined loading position is located adjacent the proximal end of the workpiece supports, and a longitudinal conveying beam is moveably located intermediate the workpiece supports. The conveying beam has an upper surface for supporting one or more workpieces. Driving apparatus for moving the conveying beam in an upward direction, a forward conveying direction toward the proximal end, a downward direction, and a backward direction is provided for enabling the conveying beam to lift workpieces from the workpiece supports for movement toward the proximal end. The downward movement is substantially vertical, and the upper surface of the conveying beam is lowered below the upper workpiece support faces prior to the backward movement returning the conveying beam to a predetermined original position. A device for detecting when a workpiece on the upper surface of the conveying beam has reached the loading position is provided, and the conveying system includes a control device, for automatically varying the length of stroke of the forward movement of the upper surface so that the detected workpiece can be properly placed at the loading position by the downward movement of the conveying beam.

19 Claims, 7 Drawing Sheets

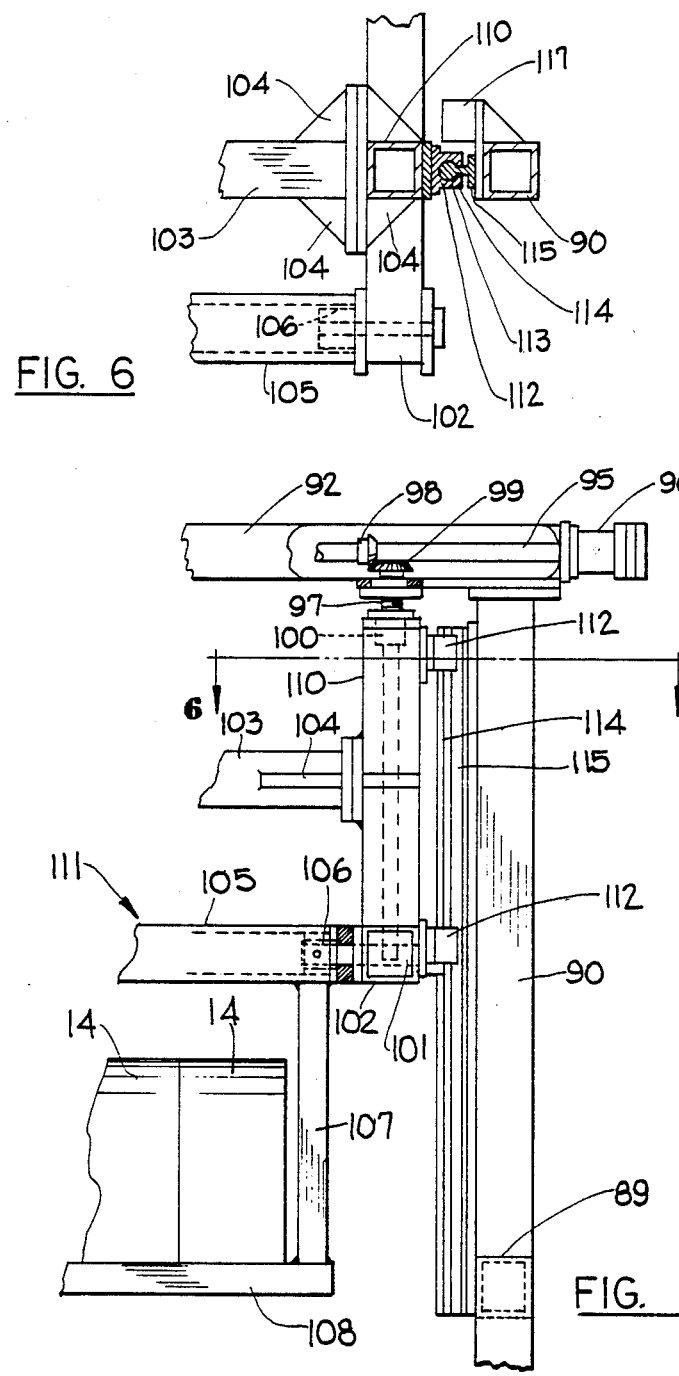

AUTOMATIC CONVEYING SYSTEM

TECHNICAL FIELD

This invention relates to a conveying system for feeding workpieces to a predetermined loading position utilizing a reciprocating conveying beam located between a pair of spaced, parallel workpiece support rails, and, more particularly, to an intermittent conveying system incorporating a walking beam arrangement having a variable forward stroke which automatically adjusts the conveying system to place a workpiece in a predetermined loading position, and which is capable of serially feeding a plurality of workpieces randomly spaced along the conveying system.

BACKGROUND ART

The use of various mechanisms for automatically feeding manufacturing machinery and the like has been widely utilized for centuries in the manufacturing and machine tool industries. One type of conveying system popular to move parts and workpieces along manufacturing assembly lines are known as "walking beam" conveyors, wherein the conveyors are equipped with several barrel cams whose rotation is synchronized to cause the "walking" or orbital movement of a beam along a closed path. The resulting path of movement of the beam in such conveyors is determined by the patterns of the particular cams used, and by continuous rotation of such cams. The beam reciprocably move objects being conveyed as it continuously oscillates in a predetermined cycle. However, the drives required to synchronize the motions of the barrel cams used to provide the "walking" motion of the beam are generally complex and sophisticated in nature, and require relative close tolerance in the patterns to prevent undue wear and fatigue which could result from improper synchronization of movement.

A walking beam conveyor which attempted to overcome some of the general problems of multiple-cam driven walking beam systems is set forth in U.S. Pat. No. 4,151,907, which issued to M. Doty on May 1, 1979. The Doty reference describes a walking beam conveyor utilizing a single cam for both vertical and horizontal movement achieved through first and second linkage connections. Doty teaches that the motion of the beam traverses a closed path once for every 360° of revolution of the cam, and that the pattern of the cam groove can be selected to allow a limited pause or "dwell" at each corner of the rectangular path, if desired. Doty further sets forth that changing connections within the linkage system can cause the beam to execute slightly longer or shorter strokes in tracing its movement path for particular applications while the Doty conveyor allegedly simplified the required mechanisms to drive a walking beam conveyor system, the system was rigidly limited to the beam stroke pattern determined by the particular cam groove Pattern and the connection of its linkage structures.

A somewhat similar workpiece feed and removal mechanism is set forth in U.S. Pat. No. 4,209,087, which issued to A. Kushigian on Jun. 24, 1980. The Kushigian mechanism included a walking beam carried by a slide mechanism which was mounted on a supporting table. The walking beam was to be raised and lowered in a generally vertical direction by a hydraulic cylinder, while the slide mechanism was reciprocated on a way by a separate hydraulic cylinder. The extent of forward travel of the slide relative to its way was limited by an adjustable stop screw, and a pair of limit switches were used to control the hydraulic cylinder. The walking beam included a plurality of precisely spaced workpiece cradles which corresponded to similar cradles in the non-moving support structure of the conveyor. Kushigian specifically teaches that the forward movement of the walking beam was to be limited to a distance equal to spacing between the centers of immediately adjacent recesses of the workpiece cradles. Consequently, the Kushigian device was designed to merely move a predetermined number of workpieces spaced from one another at a predetermined distance between adjacent workpiece cradles of a machine tool.

Similarly, U.S. Pat. No. 32,804 which issued to A. Mason on Dec. 20, 1988 (reissue date), sets forth a multiple station conveying mechanism for moving a plurality of workpieces along predetermined machining stations. The Mason transfer mechanism incorporates the use of a link system to vertically lift a shuttle supporting a plurality of workpieces received on locator and supPort pins of the shuttle assembly. Mason requires two full revolutions of its crank to move the shuttle in a generally vertical motion to its fully raised position. Once in its fully raised position, the shuttle is indexed forward to advance each of the workpieces one work station. After advancing the workpieces one work station forward, the crank is rotated in the opposite direction to lower the shuttle and disengage the locators from the workpieces, and thereby allow the shuttle to be retracted to its original position for another indexing cycle.

Other mechanisms, such as those described in U.S. Pat. No. 4,781,285, which issued to H. Schlatter et al. on Nov. 1, 1988, and U.S. Pat. No. 4,783,889, which issued to S. Hayashi on Nov. 15, 1988, describe various other transfer mechanisms for moving objects between predetermined work stations. In both of these mechanisms, the forward movement of the conveyor apparatus, when in fully uplifted position, is limited specifically to the distance between work stations, or between V-shaped notches in the fixed support rails.

In today's highly automated manufacturing facilities and machine shops, it is often desirable to have the ability to move objects along a conveying system without regard to maintaining uniform spacing between the objects, and without having to index the objects to correspond with particular work stations or alignment devices on the conveying system itself. This is especially true in situations where a mechanized loading system is utilized, such as a spot loading robot or similar device which loads one workpiece at a time into and/or out of a particular machine tool. Such situations require feeding of one workpiece at a time to a predetermined loading position. Heretofore, mechanisms available in the industry have relied upon walking beam conveyors and similar mechanisms, as described above, which require items to be transferred to be uniformly spaced and supported within various locator restraints on such conveyors to maintain that predetermined spacing. Reciprocable beam systems or walking beam systems were moved in predetermined patterns with little room for modification or error. Such predetermined spacing further complicated loading procedures, which required maintenance of those predetermined spacing patterns. The systems were inflexible and, consequently, limited in application, and most often require custom designing even for general applications.

DISCLOSURE OF THE INVENTION

It is an object of this invention to obviate the above-described problems and shortcomings of conveying systems heretofore available in the industry.

It is another object of the present invention to provide a conveYing system for intermittently feeding a plurality of workpieces serially to a predetermined loading position without a need for maintaining adjacent workpieces at any particular spacing distance, in a simple and reliable manner.

It is yet another object of the present invention to provide a conveying system for feeding a plurality of workpieces in a serial manner to a predetermined loading position, wherein such system includes means for determining when the forward-most workpiece is near such loading position, and for adjusting the forward stroke of the walking beam of the conveying system to ensure that the forward-most workpiece is deposited at the predetermined loading position regardless of that workpiece's spacing from previously conveyed or subsequently conveyed workpieces.

It is also an object of the present invention to provide a conveying system which utilizes optical sensing equipment facilitate the conveyance of workpieces to a predetermined loading position in a smooth, efficient, and safe manner.

Another object of the present invention is to provide a conveying system which can intermittently feed workpieces randomly spaced on such conveying system to a predetermined loading position in a serial manner, and which can be provided with a loading device which automatically replenishes the supply of workpieces to be conveyed to the loading position.

In accordance with one aspect of the present invention, there is provided a longitudinal conveying system for mechanically feeding one or more workpieces to a predetermined loading position. The conveying system comprising a pair of spaced, parallel workpiece supports each including an upper support face and having a distal end and a proximal end. The predetermined loading position is located adjacent the proximal end of the workpiece supports, and a longitudinal conveYing beam is moveably located intermediate the workpiece supports. The conveying beam has an upper surface for supporting one or more workpieces. Driving apparatus for moving the conveying beam in an upward direction, a forward conveying direction toward the proximal end, a downward direction, and a backward direction is provided for enabling the conveying beam to lift the workpiece from the workpiece supports for movement toward the proximal end. The downward movement is substantially vertical, and the upper surface of the conveying beam is lowered below the upper workpiece support faces prior to the backward movement returning the conveying beam to a predetermined original position. A device for detecting when a workpiece on the upper surface of the conveying beam has reached the loading position is provided, and the conveying system includes a control device for automatically varying the length of stroke of the forward movement of the upper surface so that the detected workpiece can be properly placed at the loading position by the downward movement of the conveying beam.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 5 is a partial, enlarged view of the upper right portions of the structure shown in FIG. 4, having a broken out section to show internal details;

FIG. 6 is a partial, top, cross-sectional view of the structure shown in FIG. 5, taken along line 6—6 thereof;

DETAILED DESCRIPTION OF THE INVENTION

Figure 1:
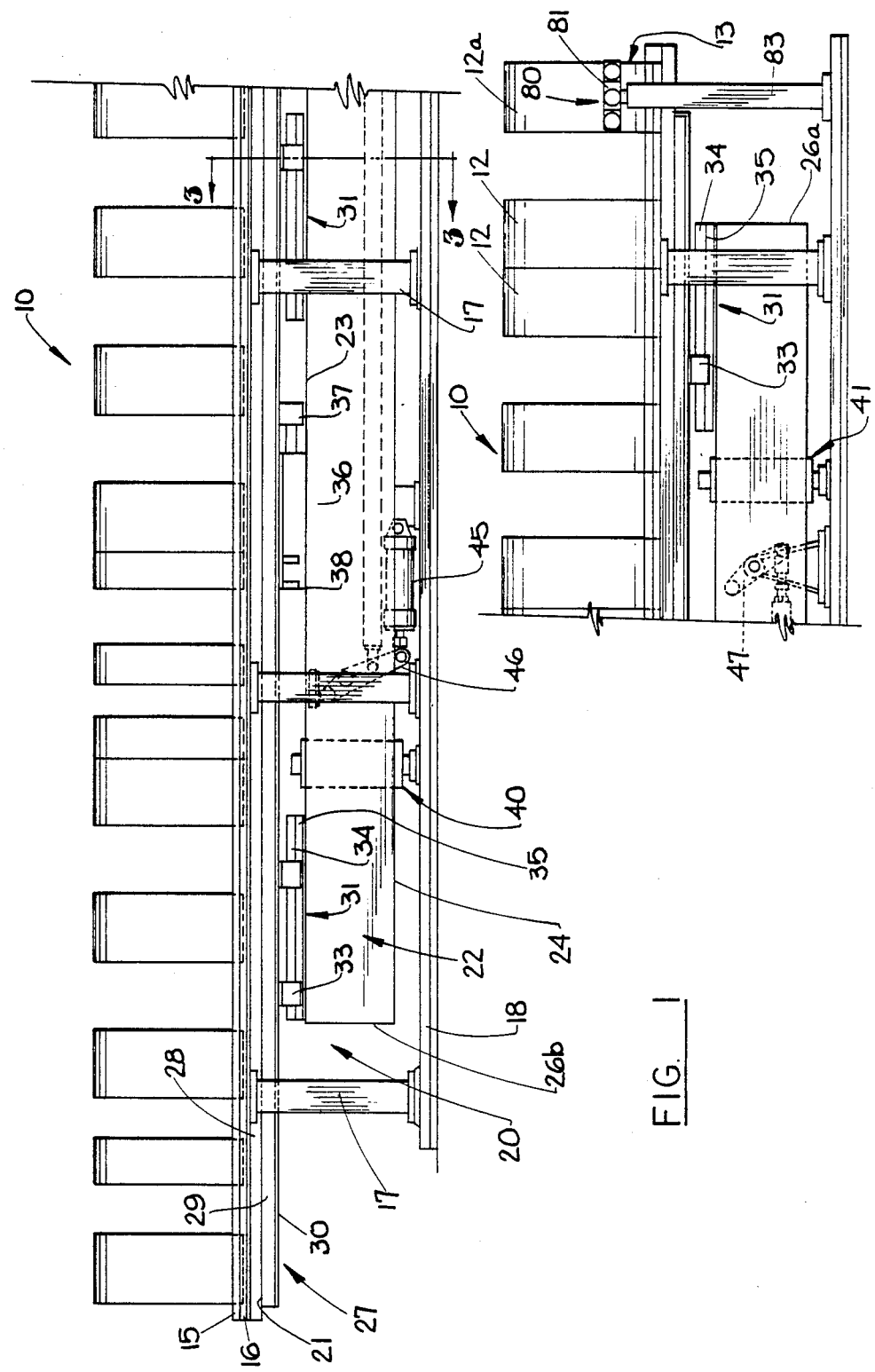
FIG. 1 is an elevational view of a conveying system made in accordance with the present invention.
Figure 2:
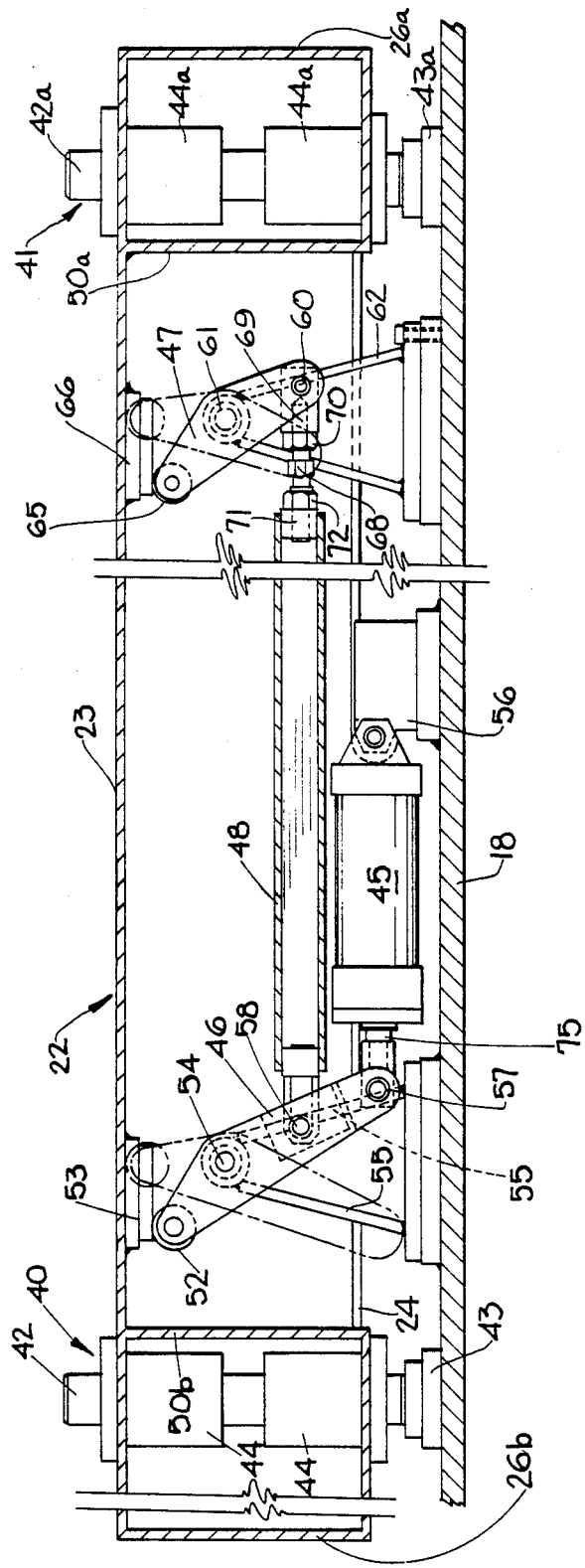
FIG. 2 is an enlarged, partial, cross-sectional view of the conveying beam arrangement illustrated in FIG. 1.
Figure 3:
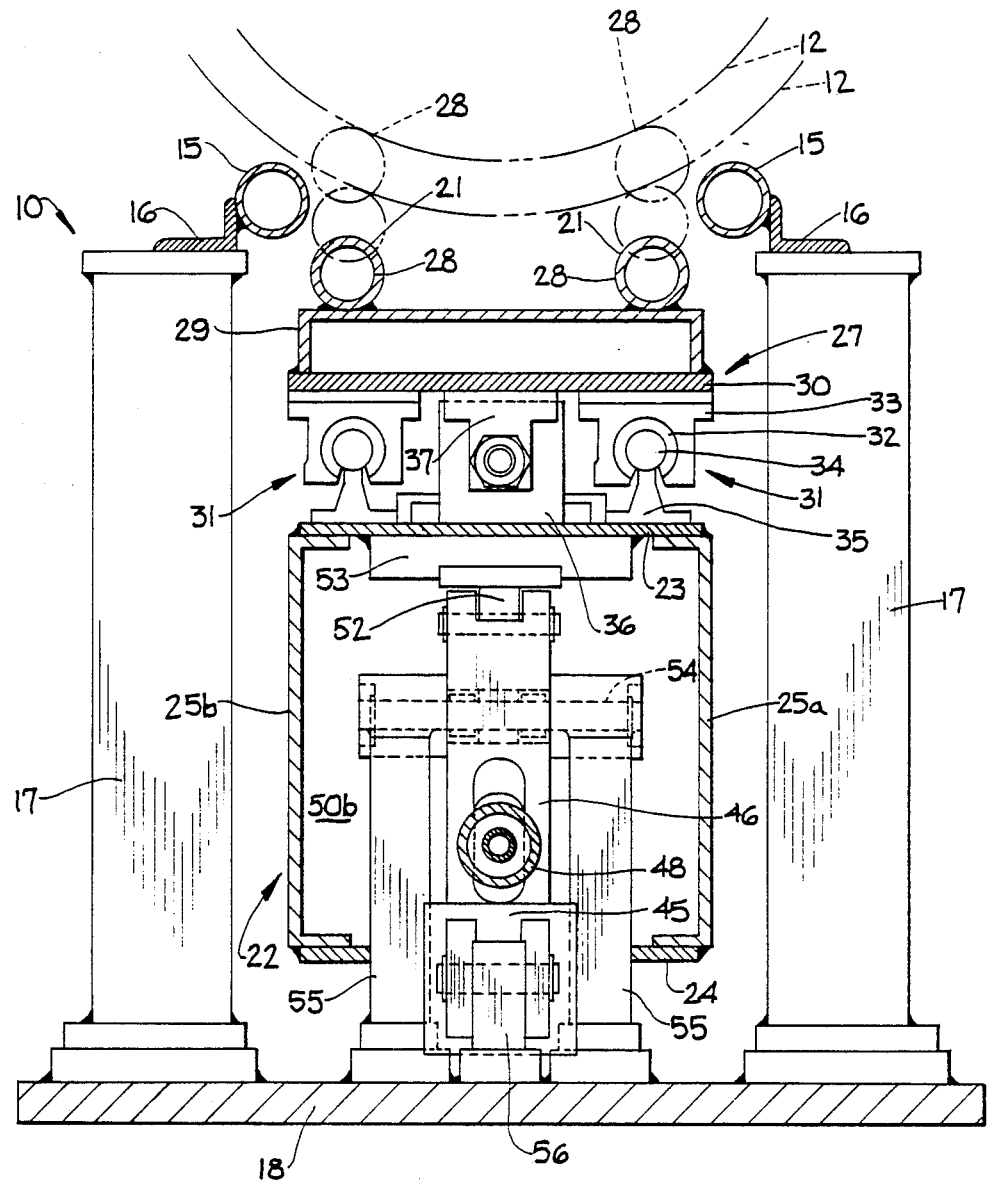
FIG. 3 is an enlarged cross-sectional view of the conveying system of FIG. 1, taken along line 3—3 thereof.

Referring now to the drawings in detail, wherein like numerals indicate the same elements throughout the views, FIGS. 1-3 illustrate conveying system 10 made in accordance with the subject invention. In particular, conveying system 10 is illustrated as including a plurality of longitudinally spaced pairs of support columns 17 mounted on base 18 and supporting a pair of angle support brackets 16. As best seen in FIG. 3, individual pairs of support columns 17 are laterally spaced from one another at a predetermined distance, which will be described more fully below. Attached to the inner upper surfaces of support brackets 16 are a pair of longitudinal, spaced workpiece support rails 15, which extend along substantially the entire length of conveying system 10.

As shown in FIG. 1, support rails 15 are designed to support a plurality of workpieces 12, which can be randomly spaced along support rails 15. Workpieces 12 are illustrated throughout the views as having at least one surface with a generally round conformation, such as wheels to be machined or otherwise processed, as shown in FIG. 1. Support rails 15 are also illustrated as exhibiting a generally round conformation, which is preferable for supporting workpieces of various shapes. Moreover, support rails 15 provide a self-centering support structure for rounded objects such as wheels and the like as a result of their spaced nature.

Located intermediate the spaced columns 17 is longitudinal conveying beam 20, illustrated as including a box-like lower structure 22 supporting an upper slidable table 27. In particular, box-like structure 22 comprises upper wall 23, lower wall 24, sidewalls 25a and b, and end walls 26a and b, respectively. As seen best in FIG. 3, slidable table 27 is attached to the upper surface of upper wall 23, and comprises a table attachment plate 30, table base 29, and a pair of longitudinal workpiece carrying tracks 28 each having an upper surface 21. Table 27 is slidably mounted on upper wall 23 for longitudinal movement relative box-like lower structure 22, as will be seen. In particular, in a preferred embodiment, table 27 is mounted upon a plurality of spaced ball-bushing structures 31, each comprising a longitudinal bushing 32 mounted within bushing housing 33 for longitudinal movement along rod 34. The rods 34 are connected directly to upper wall 23 via rod supports 35. Ball-bushing arrangements such as described herein are readily available in the industry from Thomson Industries, Inc. of Port Washington, N.Y.

A table drive cylinder 36 is attached at one end via cylinder lugs or the like to upper wall 23, and at its opposite end via cylinder bracket 37 to lower surface of table attachment plate 30. Table drive cylinder 36 provides linear movement to table 27 relative lower structure 22, as will be described in greater detail below FIG. 2 is an enlarged cross-sectional view of box-like lower structure 22, illustrating the details of a preferred embodiment thereof. As will be understood, in use, longitudinal conveying beam 20 moves in an upward direction to engage workpieces 12 originally resting on support rails 15 via the upper surfaces 21 of carrying tracks 28. The spaced carrying tracks 28 provide a natural V-block type self-centering support for rounded workpieces, as described above. Thereafter, slidable table 27 is moved in a forward direction to convey workpieces 12 toward a predetermined loading position 13 near the proximal end of the conveying system 10. The apparatus shown in FIG. 2 preferably provides for the vertical upward and downward movement of conveying beam 20.

In particular, box-like lower structure 22 is mounted on a pair of longitudinally spaced guide posts 40 and 41, respectively. Guideposts 40 and 41 thereby provide for slidable movement in the upward and downward vertical directions for lower structure 22, and ensure substantially vertical movement of conveying beam 20 while providing relative rigidity to structure 22 with regard to lateral and longitudinal movements. These guideposts comprise a central post 42 (and 42a), an attachment base 43 (43a) and a pair of ball bushings 44 (44a) to facilitate table vertical movement. It is also contemplated that inner walls 50a and 50b may be desirable to effectively isolate the bushing assemblies from other moving parts within lower structure 22.

Vertical movement is imparted to conveying beam 20 through vertical drive cylinder 45 which is rigidly attached to base or floor 18, such as by cylinder anchor 56, and through pushrod 75 which is pinned (e.g. by pin 57) to the lower end of lever 46. Lever 46 is rotatably mounted on an appropriate lever axis 54, which is supported by a plurality of struts 55 (as seen FIGS. 2 and 3). At the upper end of drive lever 46 is pinned a cam or antifriction roller 52 (e.g. as available from McGill Mfg. Co. Inc., Valparaiso, Ind.) for rolling contact with pad 53. As mentioned, pinned to the lower mid-section of drive lever 46 is adjustable tie rod 48. Tie rod 48 extends longitudinallY within lower structure 22 and is attached by tie rod pin 60 to the lower portion of second drive lever 47. Drive lever 47 is similarly rotatably mounted within bearings at lever axis 61, which is supported by a plurality of struts 62. Similarly, drive lever 47 includes a roller 65 rotatably pinned adjacent its upper end for roller contact with pad 66 attached to the lower surfaces of upper wall 23.

It is preferred that tie rod 48 be adjustable in nature in order to synchronize the rotation of drive levers 46 and 47 in response to actuation of vertical drive cylinder 45, so that rollers 52 and 65 will be positioned properly to lift beam 20. As a result, conveying beam 20 will be raised or lowered, respectively, in a uniform manner along its entire length. By utilizing rollers 52 and 65, in combination with the ball bushing guide posts supports 40 and 41, respectively, the vertical movement of lower structure 22 and conveying beam 20 overall can be accomplished in a relatively friction free manner. FIG. 2 illustrates a preferred manner of providing the adjustability to tie rod 48, as a differential screw 68 is included for interaction with the oppositely disposed nuts 70 and 72. For example, the threaded end of differential screw 68 interacting with nut 70 can be formed with a particular thread pitch (e.g. ¾-10), while the threaded end 71 which interacts with nut 72 can be formed with a different number of threads per inch (e.g. ¾-16). As a result, rotation of differential screw 68 will provide a convenient adjusting mechanism for the length of tie rod 48. It can be seen that activation of cylinder 45, wherein pushrod 75 is extended to the left of FIG. 2, will cause clockwise rotation of both levers 46 and 47, which will in turn cause box-like structure 22, and conveying beam 20 generally, to be moved vertically upwardly a predetermined distance. As shown in phantom lines in FIG. 3, upward movement of conveying beam 20 raises the upper surfaces 21 of carrying tracks 28 above the upper surfaces of support rails 15, thereby allowing conveying beam 20 to lift workpieces 12 (which are originally supported on rails 15) above rails 15. Thereafter, slidable table 27 can be moved longitudinally toward the proximal end of conveying system 10 and predetermined loading position 13.

As mentioned above, table drive cylinder 36 is provided to longitudinally reciprocate slidable table 27. As seen in FIG. 1, it is contemplated that drive cylinder 36, as well as the longitudinal ball-bushing arrangements 31, are designed to facilitate a predetermined amount of longitudinal movement of table 27 relative structure 22. As will be described below, the length of the forward longitudinal stroke and resulting movement of slidable table 27 is automatically variable during any individual forward stroke in the subject conveying system in order to precisely position the forward-most workpiece 12 at the predetermined loading position 13. Consequently, the forward stroke will be automatically variable up to a maximum predetermined length, which will be chosen in accordance with the application of the specific conveying system and within the limits of the table drive cylinder 36 and the length of the ball-bushing arrangements 31 or similar structure utilized in the system. As will be understood, the length of such forward stroke is varied in response to detection of the forward-most surface of first workpiece 12a as it is moved into a position directly above loading position 13.

As will be appreciated, upward vertical movement of conveying beam 20 thereby lifts workpieces 12 from support rails 15, and thereafter movement of table 27 conveys all of such workpieces 12 longitudinally forward toward predetermined loading position 13. If the forward-most workpiece 12a does not reach predetermined loading position 13 by the time the slidable table 27 has reached the end of its maximum forward stroke, the control program of the conveyor system 10 ends the forward stroke and initiates the downward vertical movement of conveying beam 20. Downward movement is accomplished by simply reversing the drive cylinder 45 to rotate drive levers 46 and 47 in a counterclockwise direction, thereby lowering conveying beam 20 to a position illustrated in FIG. 3. As conveying beam 20 is lowered, workpieces 12 will again be placed back onto support rails 15 as conveying beam 20 continues its downward movement to its original lowered position. After being lowered to its original position, conveying beam 20 is moved longitudinally away or backwards from predetermined loading position 13 (i.e. retracted) to its original longitudinal position. At this point, conveying beam 20 has completed a full cycle and is ready to begin its upward movement to engage workpieces 12 for further forward movement.

It is further contemplated that activation of vertical drive cylinder 45 and table drive cylinder 36 will be controlled, such as by a double solenoid detented valve and/or a proportional valve, to implement smooth acceleration, feed, and deceleration rates to provide correspondingly smooth movement of conveying beam 20 as it lifts, conveys and lowers workpieces 12. Efficient control of the acceleration, feed and deceleration of these cylinders is important to maximize the efficiency of the system, while providing uniform and safe operation and conveyance of workpieces. Additional detail of the control program is omitted, as the particular program is not critical to the present invention, and control equipment is commonly available.

An additional important feature of the present invention is the incorporation of position detecting device 80 at the proximal end of conveying system 10 in order to provide a means for detecting the 12a as it is conveyed toward predetermined loading position 13. It is contemplated that one or more photodetectors or optical sensors 81 can be mounted to appropriately detect the forward-most surface of a workpiece as it nears the desired loading position. Optical sensors 81 are shown as being mounted on detector support 83 for monitoring the position of forward-most workpiece 12a. It is preferred that a plurality of sensors 81 be utilized to enable the detection of the forward-most surface of workpiece 12a at several points before it reaches loading position 13. By providing several sensors 81, the forward stroke of conveying beam 20 can be appropriately decelerated by the control program prior to stopping the forward movement of forward-most workpiece 12a at a position directly above loading position 13. In this way, an abrupt termination of the forward stroke of conveying beam 20 can be avoided and the standard deceleration of that stroke can be implemented to ensure a smooth termination of the forward stroke prior to initiation of the downward movement of conveying beam 20.

It is also contemplated that similar detector means (not shown) can be implemented to indicate when conveying system 10 has conveyed the last workpiece to loading position 13 and requires reloading. In this regard, additional sensors may not be required if workpieces 12 are being loaded continuously at the distal end of conveying system 10, or where there is sufficient supervision of the system in general.

Figure 4:
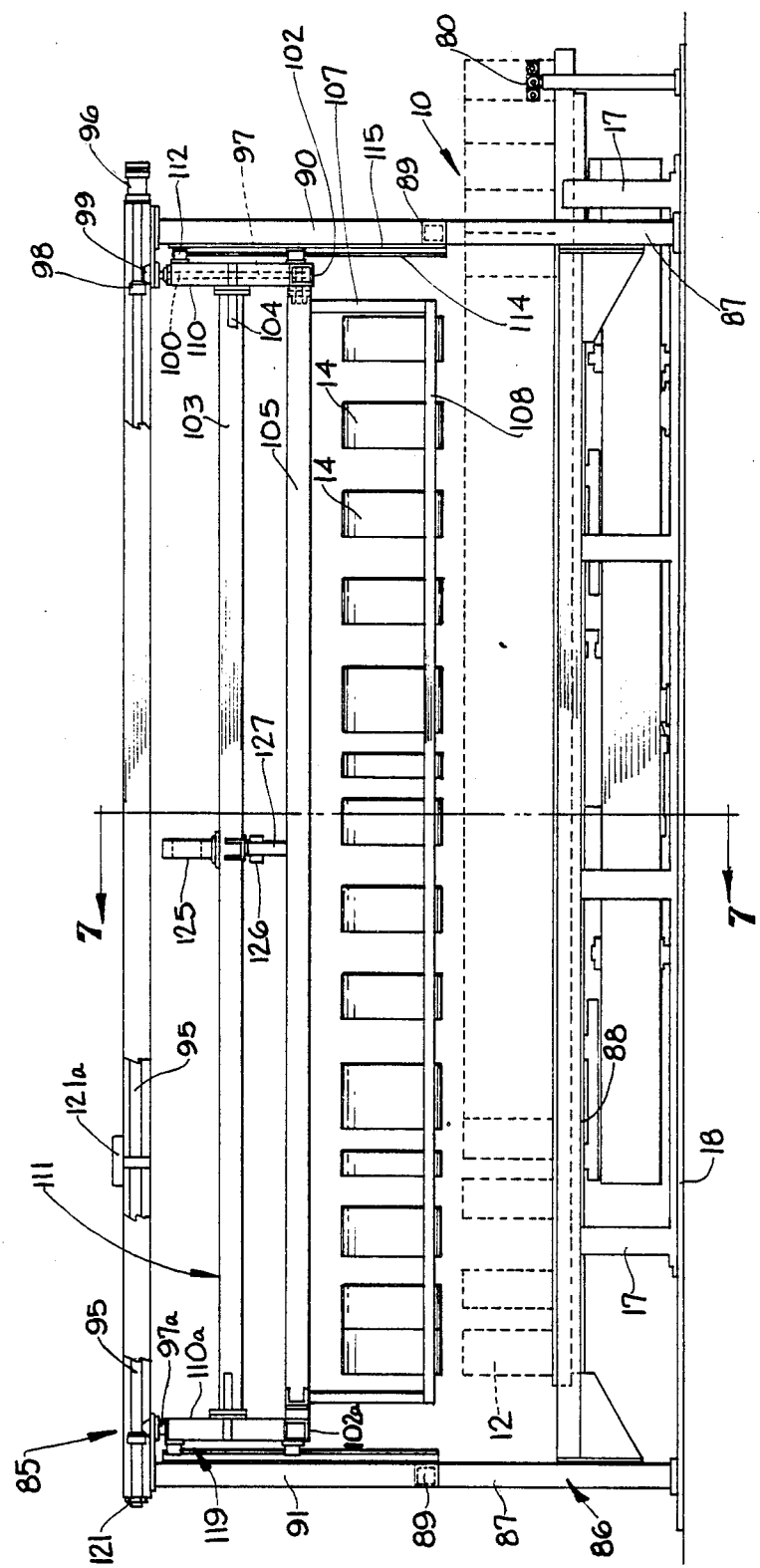
FIG. 4 is an elevational view of another embodiment of the conveying system of the subject invention.

In a highly mechanized environment, the subject invention lends itself extraordinarily well to automatic loading arrangements. In particular, because of the substantially unlimited variability of the length of the forward stroke of conveying beam 20, workpieces 12 can be entirely randomly spaced on support rails 15, and can be loaded manually or automatically without concern about relative position of workpieces 12. Similarly, as illustrated in FIGS. 1 and 4, the subject invention also allows a variety of items (e.g. wheels of varying widths) to be simultaneously processed on a single conveying system. Moreover, the rounded conformation of support rails 15 and carrying tracks 28 accommodate a wide variety of sizes and shapes of workpieces 12 to be conveyed, and act as self-centering means for workpieces having a generally rounded conformation (such as wheels and the like).

Similarly, the relatively simple structural requirements of the present invention allow direct access to support rails 15 along substantially the entire longitudinal length of system 10. As seen in FIG. 4, an automatic loading device 85 can be conveniently erected or movable to a position directly over a portion of conveying system 10 to allow efficient loading of additional workpieces 14 from above prior to conveying system 10 emptying its previous charge of workpieces 12. It should be noted that the freedom provided by obviating a need for maintaining specific spacing between adjacent workpieces on conveying system 10 allows an automatic loading system 85 to recharge the system with additional workpieces 14 at any time when no workpieces 12 are located below loading device 85.

A preferred automatic loading device 85 is illustrated in FIGS. 4-7 as comprising frame 86 having four upstanding corner posts 87 enabling loading device 85 to effectively straddle conveying system 10. Posts 87 are connected longitudinally by tie bars 88 and laterally by cross-members 89. Surmounting and centered on cross-members 89 are upstanding front support column 90 and upstanding rear support column 91, respectively. Columns 90 and 91 are integrally connected by the longitudinal head member 92.

As best shown in FIGS. 5 and 6, a ball-bushing rod 114 is attached by rod support 115 to front support column 90 to provide a vertical ball bushing way therealong. Depending from the lower surfaces of longitudinal head member 92 is an elevator housing 110 which is slidably mounted on ball bushing rod 114 via ball-bushing housings 112 which enclose bushings 113. As seen in FIGS. 4 and 5, longitudinal head member 92 includes a motor 96 attached to a rotatable drive shaft 95 housed within head member 92. Drive shaft 95 extends along the longitudinal length of head member 92 and is journaled at the left end of member 92 in bearing 121. It is contemplated that additional bearings (e.g. 121a) can advantageously be spaced along the length of head member 92, as appropriate. A bevel gear 98 is ensleeved over drive shaft 95 and meshes with a corresponding bevel gear 99 attached to screw 97 which extends into elevator housing 110. Rotational input from motor 96 is transmitted through drive shaft 95, bevel gears 98 and 99, and screw 97 to nut 100 to impart vertical motion to elevator housing 110 and the structures attached thereto. Similarly, upstanding support column 91 at the opposite end of loading device 85 includes a ball bushing arrangement 119 to slidably support a corresponding elevator housing 110a, which includes a screw 97a and appropriate bevel gears driven by drive shaft 95. In this way, vertical movement is provided to the carriage assembly 111 of loading device 85.

Figure 7:
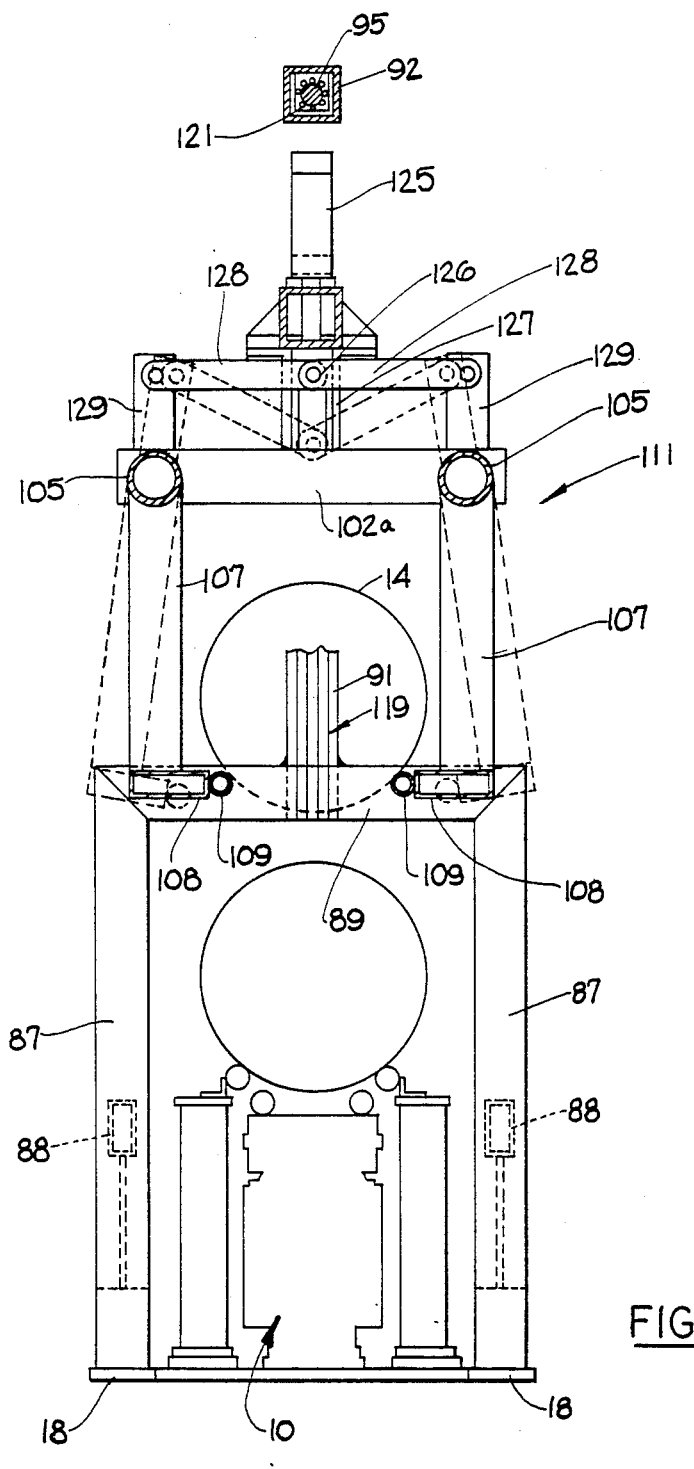
FIG. 7 is an enlarged, partial cross-sectional automatic loading apparatus of the view of the conveying system shown in FIG. 4, taken along line 7—7 thereof.

Carriage assembly 111 comprises a carriage support member 103 which extends longitudinally between elevator housings 110 and 110a. Flange members 104 provide lateral stability to carriage support 103. At the lower ends of elevator housings 110 and 110a, respectively, are attached the outwardly extending shoulder beam supports 102 and 102a, respectively. As seen best in FIG. 6, shoulder beam support 102 extends laterally to provide rotatable support for axles 106 which rotatably connect the longitudinal ends of rotatable, clamp shoulder beams 105. As seen in FIG. 7, rotatable clamp shoulder beams 105 are preferably of circular cross-section and are integrally connected to the downwardly depending clamp arms 107 and to the upwardly extending clamp arm extensions 129. FIG. 7 has been simplified by showing only a portion of support column 91 and its related structures (e.g. ball bushing arrangement 119) normally adjacent the lower portions of head member 92. As will be seen, shoulder beams 105 provide a pivot point for clamp arms 107 to enable release of additional workpieces 14 during loading procedures.

The distal ends of oppositely disposed pairs of clamp arms 107 are connected by the longitudinally extending pair of rectangular clamp beams 108, and the innermost surfaces of clamp beams 108 are provided with longitudinal clamp support rails 109, which will interface with lower surfaces of additional workpieces 14 (e.g. wheels) held within loading device 85. Mounted near the center of carriage support member 103 is the carriage open/close cylinder 125, which controls the clamp arms 107 for holding and releasing additional workpieces 14. In particular, cylinder 125 includes a piston attached to a roller 126 which is slidably supported within roller tracks 127 for reciprocable vertical motion. Also attached at roller 126 are link arms 128 which are attached to the upper ends of clamp arm extensions 129.

Figure 8:
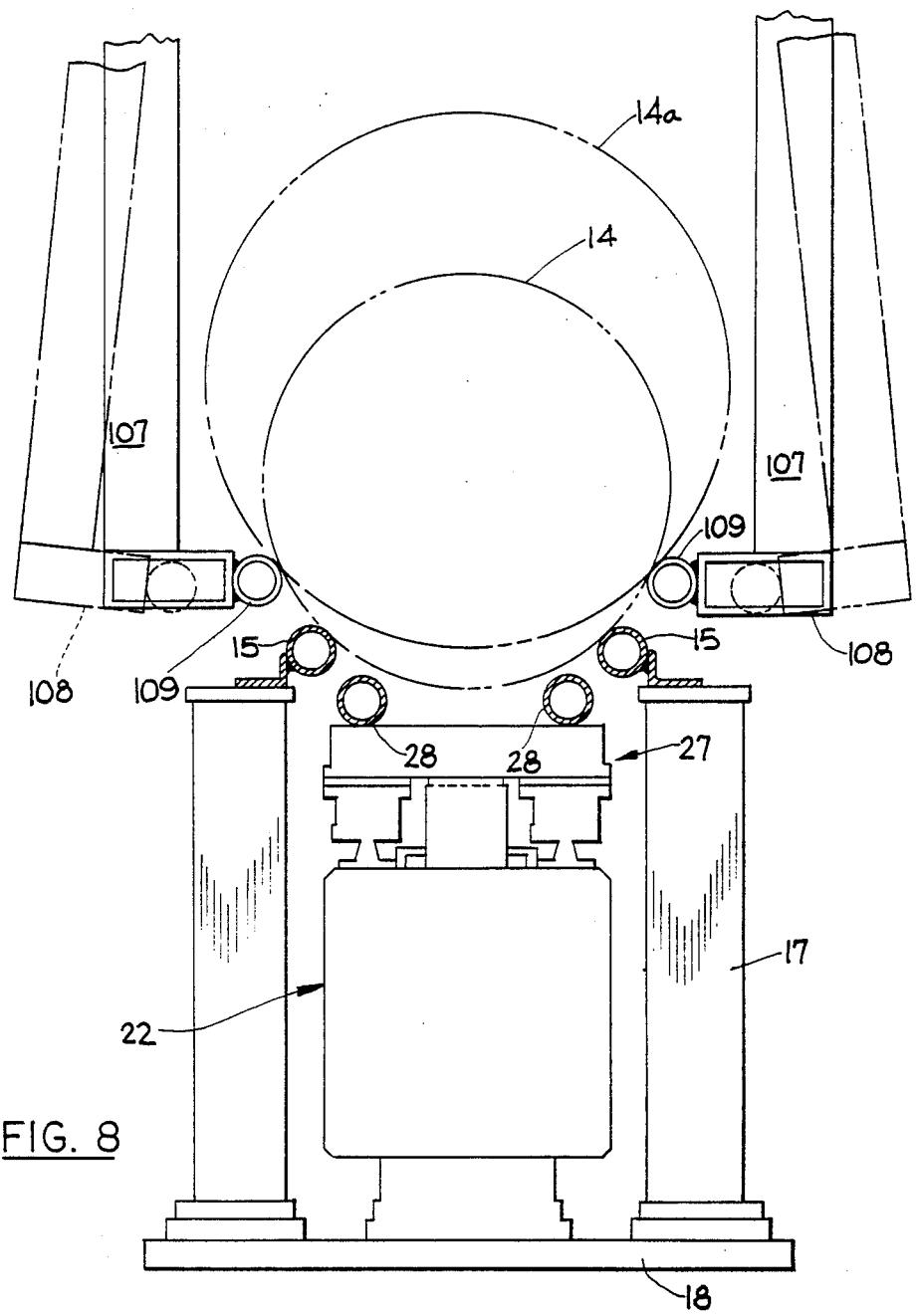
FIG. 8 is a simplified, enlarged, end view of the conveying system illustrated in FIG. 4, illustrating loading procedures.

When additional workpieces 14 held within loading device 85 are to be placed onto conveyor system 10, motor 96 is activated to lower elevator housings 110 and 110a, which in turn lower the entire carriage 111 such that workpieces 14 come to rest upon workpiece support rails 15, as indicated in FIG. 8. Once workpieces 14 are supported on support rails 15, cylinder 125 is activated, pushing roller 126 in a downward direction, resulting in an outward rotation of clamp arms 107. Outward rotation of clamp arms 107 disengages clamp support rails 109 from the periphery of workpieces 14, and enables carriage 111 to be raised vertically without interference with workpieces 14. Carriage 111 is then returned to its original raised vertical position and cylinder 125 is activated to close clamp arms 107. At this time, loading device 85 is itself reloaded with additional workpieces 14 for later reloading procedures.

FIG. 8 further illustrates the adaptability of the conveying system described herein for workpieces (e.g. 14 and 14a) of various shapes and sizes. As mentioned above, while the particular structure described herein provides the added benefit of self-centering support for workpieces having rounded cross-sections, it should be understood that the conveying system of the subject invention is equally applicable to workpieces of various shapes and sizes. It should further be understood that the specific structure set forth for automatic loading device 85 is merely a preferred embodiment of an automatic loading system which can be easily integrated with the conveying system of the subject invention. Other devices for individually loading or gang-loading a plurality of workpieces could equally be employed.

Having shown and described the preferred embodiments of the present invention, further adaptions of the conveying system described herein can be accomplished by appropriate modifications by one of ordinary skill in the art without departing from the scope of the present invention. Several of these potential modifications have been mentioned, and others will be apparent to those skilled in the air. For example, while separate drive means have been described for upward/downward and forward/backward movement of the conveying beam, a single drive might be adapted to accomplish all four movements. Accordingly, the scope of the present invention should be considered in terms of the following claims and is understood not to be limited to the details of structure and operation shown and described in the specification and drawings.

We claim:

1. A longitudinal conveying system for mechanically feeding at least one workpiece to a predetermined loading position, said system comprising:
   a pair of spaced, parallel workpiece supports, said supports each comprising upper workpiece support faces and having a distal end and a proximal end;
   a predetermined loading position located adjacent said proximal end;
   a longitudinal conveying beam movably located intermediate said workpiece supports, said beam having an upper surface for supporting at least one workpiece;
   driving means for moving said conveying beam in an upward direction, in a forward conveying direction toward said proximal end, in a downward direction, and in a backward direction, thereby enabling said conveying beam to lift said at least one workpiece from said workpiece supports for movement toward said proximal end, said downward movement being substantially vertical, and said upper surface of said conveying beam being lowered below said upper workpiece support faces prior to said backward movement, said backward movement returning said conveying beam to a predetermined original position;
   means for detecting a workpiece on said upper surface of said conveying beam as it approaches said loading position; and
   control means responsive to said means for detecting for automatically varying the length of stroke of the forward movement of said driving means such that the detected workpiece can be properly placed at said loading position by the downward movement of said conveying beam.

2. The conveying system of claim 1 further comprising speed control means for providing smooth acceleration and deceleration of said driving means at the beginning and end of one or more of its movements, thereby providing smooth feeding motion of said at least one workpiece along said conveying system.

3. The conveying system of claim 1, wherein said driving means comprises separate driving arrangements for movement of said beam in the forward conveying direction and for movement in the upward and downward directions.

4. The conveying system of claim 1, wherein said conveying beam comprises a box-like structure having a top wall which supports a longitudinally slidable table, said table providing said upper workpiece support surface.

5. The conveying system of claim 4, wherein said driving means comprises a driving arrangement for moving said box-like structure in said upward and downward directions, and an independent driving arrangement for moving said slidable table in a longitudinal direction relative said top wall for conveying said at least one workpiece forward toward said predetermined loading position, and for moving said table backward to its original position when said box-like structure is in a downward position.

6. The conveying system of claim 1, wherein said detecting means comprises an optical sensor which detects the forward-most surface of a workpiece supported on said conveying beam, said sensor providing a signal upon detecting the forward-most surface to end the forward movement of said conveying beam and to implement the downward vertical movement thereof.

7. A longitudinal conveying system for mechanically feeding at least one workpiece to a predetermined loading position, said system comprising:
- a pair of spaced, parallel workpiece supports, said supports each comprising upper workpiece support faces and having a distal end and a proximal end;
- a predetermined loading position located adjacent said proximal end;
- a longitudinal conveying beam movably located intermediate said workpiece supports, said beam having an upper surface for supporting at least one workpiece;
- driving means for moving said conveying beam in an upward direction, in a forward conveying direction toward said proximal end, in a downward direction, and in a backward direction, thereby enabling said conveying beam to lift said at least one workpiece from said workpiece supports for movement toward said proximal end, said downward movement being substantially vertical, and said upper surface of said conveying beam being lowered below said upper workpiece support faces prior to said backward movement, said backward movement returning said conveying beam to a predetermined original position;
- means for detecting when a workpiece on said upper surface of said conveying beam has reached said loading position;
- control means for automatically varying the length of stroke of the forward movement of said driving means such that the detected workpiece can be properly placed at said loading position by the downward movement of said conveying beam;
- speed control mans for providing smooth acceleration and deceleration of said driving means at the beginning and end of one or more of its movements, thereby providing smooth feeding motion of said at least one workpiece along said conveying system; and
- said detecting means further comprising a plurality of optical sensors to detect the forward-most surface of said workpiece as it is moved toward said loading position on said conveying beam, and to enable deceleration of the forward movement of said conveying beam prior to termination of said forward movement.

8. The conveying system of claim 1, said system further comprising an automatic loading device which places one or more workpieces on said workpiece supports.

9. A longitudinal conveying system for mechanically feeding at least one workpiece to a predetermined loading position, said system comprising:
- a pair of spaced, parallel workpiece supports, said supports each comprising upper workpiece support faces and having a distal end and a proximal end;
- a predetermined loading position located adjacent said proximal end;
- a longitudinal conveying beam movably located intermediate said workpiece supports, said beam having an upper surface for supporting at least one workpiece;
- driving means for moving said conveying beam in an upward direction, in a forward conveying direction toward said proximal end, in a downward direction, and in a backward direction, thereby enabling said conveying beam to lift said at least one workpiece from said workpiece supports for movement toward said proximal end, said downward movement being substantially vertical, and said upper surface of said conveying beam being lowered below said upper workpiece support faces prior to said backward movement, said backward movement returning said conveying beam to a predetermined original position;
- means for detecting when a workpiece on said upper surface of said conveying beam has reached said loading position;
- control means for automatically varying the length of stroke of the forward movement of said driving means such that the detected workpiece can be properly placed at said loading position by the downward movement of said conveying beam; and
- an automatic loading device which places one or more workpieces on said workpiece supports, wherein said conveying system is designed to convey workpieces having at least one rounded surface to be supported, said spaced parallel workpiece supports provide self-centering support for said workpieces, and said automatic loading device comprises a pair of opposed jaw members spaced apart at a distance less than the width of diameter of workpieces to be loaded and greater than the spacing between said parallel workpiece supports, said jaw members being moveable outwardly to release workpieces during loading operations.

10. A conveying system for serially conveying workpieces to a predetermined loading position, said system comprising;
- a pair of spaced, parallel workpiece supports, said workpiece supports each comprising upper workpiece support face and having a distal end and a proximal end, wherein said loading position is located adjacent said proximal end;
- a longitudinal conveying beam movably located between said workpiece supports, said beam having an upper surface for engaging and supporting workpieces, and said beam having an original position wherein said upper surface is located below said support faces of said workpiece supports and out of engagement with workpieces supported on said workpiece supports;
- first driving means for raising said conveying beam in a substantially vertical direction from its original position for engaging workpieces on said workpiece supports and lifting said workpieces above said workpiece supports, and for lowering said conveying beam in a vertical direction to replace said workpieces on said workpiece supports;
- second driving means for moving at least the upper surface of said conveying beam in a longitudinal direction for moving workpieces forward toward said loading position when said beam is in raised position, and for returning at least the upper surface in a backward direction to a retracted position when said beam is lowered to its original position;
- sensing means for determining when the forward-most surface of a workpiece being moved longitudinally on said upper surface has reached a position vertically above said loading position; and control means for automatically varying the length of stroke of said upper surface and terminating the forward longitudinal movement of said upper surface in response to input from said sensing means, whereby said upper surface can be lowered to place that workpiece at said loading position.

11. The conveying system of claim 10 further comprising speed control means for providing smooth acceleration and deceleration of movements generated by said driving means, thereby providing smooth feeding motion of said at least one workpiece along said conveying system.

12. The conveying system of claim 10, wherein said conveying beam comprises a box-like structure having a top wall which supports a longitudinally slidable table, said table providing said upper workpiece support surface.

13. A conveying system for serially conveying workpieces to a predetermined loading position, said system comprising;
- a pair of spaced, parallel workpiece supports, said workpiece supports each comprising an upper workpiece support face and having a distal end and a proximal end, wherein said loading position is located adjacent said proximal end;
- a longitudinal conveying beam movably located between said workpiece supports, said beam having an upper surface for engaging and supporting workpieces, and said beam having an original position wherein said upper surface is located below said support faces of said workpiece supports and out of engagement with workpieces supported on said workpiece supports;
- first driving means for raising said conveying beam in a substantially vertical direction from its original position for engaging workpieces on said workpiece supports and lifting said workpieces above said workpiece supports, and for lowering said conveying beam in a vertical direction to replace said workpieces on said workpiece supports;
- second driving means for moving at least the upper surface of said conveying beam in a longitudinal direction for moving workpieces forward toward said loading position when said beam is in raised position, and for returning at least the upper surface in a backward direction to a retracted position when said beam is lowered to its original position;
- sensing means for determining when the forward-most surface of a workpiece being moved longitudinally on said upper surface has reached a position vertically above said loading position;
- control means for automatically terminating the forward longitudinal movement of said upper surface in response to input from said sensing means, whereby said upper surface can be lowered to place that workpiece at said loading position; and
- said sensing means comprising a plurality of optical sensors spaced longitudinally adjacent said proximal end to detect the forward-most surface of a workpiece being moved longitudinally toward said loading position and to enable appropriate deceleration of the longitudinally forward movement of said upper surface prior to termination of said forward movement, thereby providing a smooth transition between the termination of a forward movement stroke and the downward movement of said beam.

14. The conveying system of claim 10, said system further comprising an automatic loading device which places one or more workpieces on said workpiece supports.

15. A conveying system for serially conveying workpieces to a predetermined loading position, said system comprising;
- a pair of spaced, parallel workpiece supports, said workpiece supports each comprising an upper workpiece support face and having a distal end and a proximal end, wherein said loading position is located adjacent said proximal end;
- a longitudinal conveying beam movably located between said workpiece supports, said beam having an upper surface for engaging and supporting workpieces, and said beam having an original position wherein said upper surface is located below said support faces of said workpiece supports and out of engagement with workpieces supported on said workpiece supports;
- first driving means for raising said conveying beam in a substantially vertical direction from its original position for engaging workpieces on said workpiece supports and lifting said workpieces above said workpiece supports, and for lowering said conveying beam in a vertical direction to replace said workpieces on said workpiece supports;
- second driving means for moving at least the upper surface of said conveying beam in a longitudinal direction for moving workpieces forward toward said loading position when said beam is in raised position, and for returning at least the upper surface in a backward direction to a retracted position when said beam is lowered to its original position;
- sensing means for determining when the forward-most surface of a workpiece being moved longitudinally on said upper surface has reached a position vertically above said loading position;
- control means for automatically terminating the forward longitudinal movement of said upper surface in response to input from said sensing means, whereby said upper surface can be lowered to place that workpiece at said loading position; and
- an automatic loading device which places one or more workpieces on said workpiece supports, said automatic loading device comprising a pair of longitudinally opposed jaw members aligned substantially parallel with said workpiece supports and designed to retain a plurality of workpieces to be lowered onto said workpiece supports for recharging said conveying system with workpieces to be serially fed to said loading position, said jaw members being hingedly supported for outward articulation to release said retained workpieces after the loading device has lowered said workpieces onto said workpiece supports.

16. The conveying system of claim 15, wherein said workpieces comprise at least one rounded surface which can be supported by said workpiece supports, said upper surface and said jaw members.

17. A conveying system for serially conveying workpieces to a predetermined loading position, said system comprising:
- a pair of spaced, parallel workpiece supports, said workpiece supports each comprising an upper workpiece support face and having a distal end and a proximal end;

a predetermined loading position to which the workpieces are to be conveyed for serial access by other processing equipment, said loading position located on said workpiece supports adjacent said proximal ends;

a longitudinal conveying beam movably located between said spaced workpiece supports, said beam having a lower structure having a top wall which supports a longitudinally slidable table, said table providing an upper surface for engaging and supporting workpieces, and said beam having an original position wherein said upper surface is located below said support faces of said workpiece supports and out of engagement with workpieces supported on said workpiece supports;

first driving means for raising said conveying beam in a substantially vertical direction from its original position for engaging workpieces on said workpiece supports and lifting said workpieces to a raised position above said workpiece supports, and for lowering said conveying beam in a vertical direction to replace said workpieces on said workpiece supports and to return said conveying beam to its original position;

second driving means for moving at least the slidable table of said conveying beam in a longitudinal direction relative said workpiece supports for moving workpieces forward toward said loading position when said beam is in raised position, and for returning at least the slidable table in a backward direction to a retracted position when said upper surface is lowered below said support faces;

sensing means for determining when the forwardmost surface of a workpiece being moved longitudinally on said upper surface has reached a position vertically above said loading position;

control means for automatically varying the length of stroke of said upper surface and terminating the forward longitudinal movement of said upper surface in response to input from said sensing means, whereby said upper surface can be lowered to place that workpiece at said loading position; and an automatic loading device for simultaneously placing a plurality of workpieces on said workpiece supports to recharge said conveying system with workpiece to be conveyed as necessary.

18. The conveying system of claim 17 further comprising speed control means for providing smooth acceleration and deceleration of movements generated by said driving means thereby providing smooth feeding motion of said workpieces along said conveying system.

19. The conveying system of claim 18, wherein said conveying beam comprises a box-like structure having a top wall which supports a longitudinally slidable table, said table providing said upper workpiece support surface.

* * * * *